US009754591B1

(12) United States Patent
Kumar et al.

(10) Patent No.: US 9,754,591 B1
(45) Date of Patent: Sep. 5, 2017

(54) DIALOG MANAGEMENT CONTEXT SHARING

(71) Applicant: Amazon Technologies, Inc., Reno, NV (US)

(72) Inventors: Nishant Kumar, Seattle, WA (US); David Robert Thomas, Woodinville, WA (US); Sumedha Arvind Kshirsagar, Seattle, WA (US); Vikas Jain, Bellevue, WA (US); Jeff Bradley Beal, Edgewood, WA (US); Ajay Gopalakrishnan, Seattle, WA (US); Shishir Sridhar Bharathi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 173 days.

(21) Appl. No.: 14/083,332

(22) Filed: Nov. 18, 2013

(51) Int. Cl.
*G10L 15/18* (2013.01)
*G10L 17/00* (2013.01)
*G10L 15/22* (2006.01)
*G10L 15/183* (2013.01)

(52) U.S. Cl.
CPC ............ *G10L 17/005* (2013.01); *G10L 15/18* (2013.01); *G10L 15/183* (2013.01); *G10L 15/22* (2013.01)

(58) Field of Classification Search
None
See application file for complete search history.

(56) References Cited

U.S. PATENT DOCUMENTS

| | | | | |
|---|---|---|---|---|
| 6,246,981 | B1 * | 6/2001 | Papineni | G10L 15/22 704/235 |
| 7,137,126 | B1 * | 11/2006 | Coffman | G06F 17/30899 704/200 |
| 2006/0031853 | A1 * | 2/2006 | Kuperstein | G10L 15/22 719/320 |
| 2011/0144999 | A1 * | 6/2011 | Jang | G06K 9/00892 704/270.1 |
| 2014/0019522 | A1 * | 1/2014 | Weng | G06F 17/30964 709/203 |
| 2014/0257792 | A1 * | 9/2014 | Gandrabur | G10L 15/1815 704/9 |

* cited by examiner

*Primary Examiner* — Pierre-Louis Desir
*Assistant Examiner* — Yi-Sheng Wang
(74) *Attorney, Agent, or Firm* — Knobbe, Martens, Olson & Bear, LLP

(57) ABSTRACT

Features are disclosed for performing functions in response to user requests based on contextual data regarding prior user requests. Users may engage in conversations with a computing device in order to initiate some function or obtain some information. A dialog manager may manage the conversations and store contextual data regarding one or more of the conversations. Processing and responding to subsequent conversations may benefit from the previously stored contextual data by, e.g., reducing the amount of information that a user must provide if the user has already provided the information in the context of a prior conversation. Additional information associated with performing functions responsive to user requests may be shared among applications, further improving efficiency and enhancing the user experience.

24 Claims, 6 Drawing Sheets

DIALOG MANAGEMENT CONTEXT SHARING

BACKGROUND

Spoken language processing systems include various modules and components for receiving speech input from a user, determining what the user said, and acting upon what the user said. In some implementations, a spoken language processing system includes an automatic speech recognition ("ASR") module that receives audio input of a user utterance and generates one or more likely transcriptions of the utterance. Spoken language processing systems may also include a natural language understanding ("NLU") module that receives textual input, such as a transcription of a user utterance, and determines the meaning of the text in a way that can be acted upon, such as by a computer application. Spoken language processing systems may also include a dialog manager ("DM") that manages interaction of a user with the system, prompts the user for information that may be required to execute various applications or perform various functions, provides feedback to the user, etc. For example, a user of a mobile phone may make a spoken command to initiate a phone call. Audio of the spoken command can be transcribed by the ASR module, and the NLU module can determine the user's intent (e.g., that the user wants to initiate a phone call) from the transcription. The dialog manager can prompt the user for any additional information required to initiate the phone call (e.g., what number the user would like to call).

In prompting users for information required to perform various functions, dialog managers can follow pre-determined scripts, follow rules regarding what information is required, etc. Some dialog managers may initiate a series of questions, with each question designed to obtain a particular type of information from the user. For example, when a user would like to schedule a flight, the dialog manager may prompt the user regarding what the user would like to do (DM: "What would you like to do?" User: "Book a flight."), where the user will be travelling from (DM: "Where would you like to depart?" User: "Los Angeles"), where the user will be travelling to (DM: "Where would you like to go?" User: "Chicago"), etc. Some dialog managers allow a user to provide information, and the dialog manager can prompt the user for any additional required information (User: "I want to book a flight to Chicago." DM: "Where would you like to depart?"). The user experience and perceived performance of dialog managers and other spoken language processing system features may be defined in terms of the number of prompts to which a user must respond, the accuracy of the system in interpreting user answers to the prompts, and the total amount of time and effort that must be expended to complete a spoken command or query.

BRIEF DESCRIPTION OF DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure.

DETAILED DESCRIPTION

Introduction

Figure 1A:
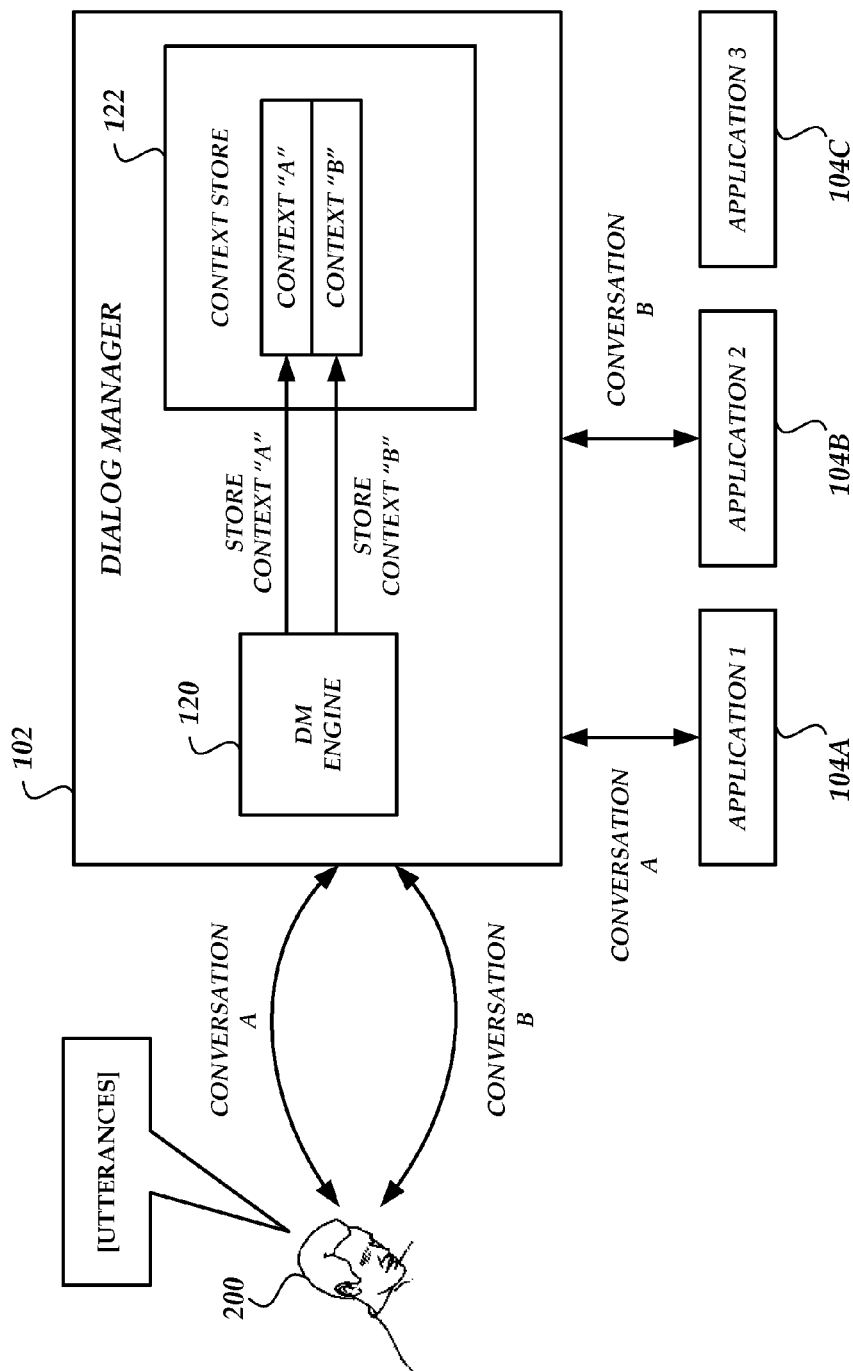
FIGS. 1A and 1B are block diagrams of illustrative interactions between a user, a dialog manager and various applications showing context sharing.

Spoken language processing systems can use dialog managers to manage interaction with users. One function of a dialog manager is to prompt a user for information that may be required to perform a task requested by the user. For example, a user may wish to book a flight to a certain location, such as Chicago, Ill. The user may say "I'd like to book a flight to Chicago." The dialog manager may prompt the user regarding when the user would like to fly, to which airport in Chicago the user would like to fly, and the like. The dialog manager may initiate a flight booking application or service to book the flight, provide the user with confirmation, etc. Such an interaction between a user and a spoken language processing system may be referred to as a "dialog"—one or more user utterances associated with a particular task (e.g., one or more user utterances and optional system responses during which a user gives a command or requests information, and the spoken language processing system executes the command or provides the requested information). A "conversation" may be one or more dialogs relating to the same user task or which involve execution of the same application or function. After such a conversation, the spoken language processing system is not waiting for additional information to carry out a user command or respond to the request, and the user is not waiting for additional information or for execution of the command. A user may engage in multiple (e.g., two or more) such conversations in a given period of time.

Some dialog managers store contextual information for a given conversation in order to resolve anaphora within a given conversation. The contextual information may include a map of all words spoken by a user and all words spoken to the user, or some subset thereof, for a given dialog or for the conversation as a whole. The context may be used later in the conversation to resolve anaphora. In the flight booking example, if a user says "When is the next flight there?" the contextual information may be used to help determine that "there" refers to "Chicago." Typically, dialog managers treat each conversation separately. Users may be prompted to provide all information required to carry out a command or perform some other function in connection with a subsequent conversation, even if the user may have provided one or more required items of information in a prior conversation. This often occurs when, e.g., a subsequent conversation includes a command that is not an extension of the previous conversation or is not otherwise directly related to the previous conversation. Returning to the example above, if a user subsequently says "Tell me what the weather is going to be like there," a conventional dialog manager may prompt the user for a location and a date. The dialog manager may do so even though the user previously specified a target location (Chicago, Ill.) and a date (the date of the flight) in the flight booking conversation because the new request is part of a new dialog or conversation involving execution of a different application than the flight booking application. Requiring a user to provide information that the user has recently provided is inefficient, can frustrate the user, and can generally result in a poor user experience.

Some applications may be configured to provide information in addition to the information that was requested, or information in a different modality that what was requested. In the weather example above, a weather application or service may be accessed to obtain the weather forecast and provide the forecast to the user (e.g., synthesized speech indicating that "The weather will be 80 degrees and sunny.") However, the weather application may also be able to provide more detailed forecasts (e.g., 7-day or hourly forecasts) or forecast in a different modality (e.g., a visual weather map) in addition to the synthesized speech read out of the forecast. Such additional information or information associated with a different modality may be suitable for use by a different application in response to a subsequent request from the user, such as request to send weather information to another device or to a contact's email address. Conventional dialog managers may not have any way of receiving and storing information provided by one application for the express purpose of later sharing it with another application rather than to be immediately (or substantially immediately) provided to the user in connection with the current user request or dialog. Instead, conventional dialog managers typically store only information provided by a user or to a user in connection with the immediate function, command, or conversation; there is no facility to share information between applications that was not first proved by or to the user.

Aspects of this disclosure relate to retaining contextual information for one or more conversations. Contextual information from a prior conversation may be used while conducting a subsequent conversation in order to reduce the amount of information that a user is prompted to provide, to provide additional information, to provide information in a different modality, or to otherwise improve the user experience. In some cases, contextual information from a prior conversation that involved execution of a particular function or application may be used in a subsequent conversation, even if the subsequent conversation involves execution of a different function or application. Returning to the example above, a dialog manager using the techniques of the present disclosure may store contextual information regarding the flight booking conversation. The context may be stored as one or more named entities (e.g., "Chicago" is a location entity, the departure date specified by the user is a date entity, etc.). In some embodiments, the contextual information may be stored in other ways, such as transcripts of user utterances, collections of "tagged" information or other information associated with execution a particular function, a "map" of prior conversations, etc. Subsequently, when the user initiates the weather conversation, the dialog manager may determine that the stored contextual information includes a location and a date, which are required by the weather application in order to provide weather information. The dialog manager may provide the location and date information to the weather application without prompting the user. The dialog manager may then provide feedback to the user (e.g., the weather forecast for Chicago on the date of the user's arrival) without prompting the user for the location and/or date. Accordingly, the user-perceived performance of the system may be improved, because the user is provided with the desired weather information more quickly and without being prompted for information that the user has already provided.

Additional aspects of the present disclosure relate to the explicit sharing of information among applications during different conversations. The shared information may be stored as part of the contextual information described above or as separate information. The shared information may then be made available for use during subsequent conversations. Returning to the example above, the weather application may provide the forecasted temperature and conditions on the specified date so that the dialog manager may provide feedback to the user in the form of synthesized speech (e.g., "It will be 60 degrees and windy in Chicago on Friday."). However, the weather application may also generate a more comprehensive or longer-term forecast, such as an hourly forecast, a 7-day forecast, a regional weather map, etc. Such information may not be well suited to presentation in the form of synthesized speech, but may be better presented visually on a display. The weather application may therefore provide the additional information or information associated with a modality that is different than the spoken dialog modality (e.g., as an image or HTML fragment) to a shared context store, or to some other data store, and the dialog manager can provide other applications with access to the additional information. In some embodiments, applications may "tag" the additional information or otherwise specify one or more characteristics of the additional information. For example, the weather application may tag an HTML fragment of a long-term weather forecast as "sendable" (or some other tag), indicating that it is suitable to be emailed. Subsequent to audible presentation of the weather, a user may say: "Send that to John." The dialog manager may inspect the stored context to identify any recent information that is tagged as "sendable" (e.g., in response to a request from the email application, or proactively when executing the email application). The dialog manager may then use an email application or service to send the long term weather forecast in an email message to a contact named "John," even though the user did not expressly state that the long-term weather forecast should be sent. In this way, a more natural and response user experience can be provided.

Although aspects of the embodiments described in the disclosure will focus, for the purpose of illustration, on a spoken language processing system engaging in spoken "conversations" or "dialogs" with a user that include user utterances, one skilled in the art will appreciate that the techniques disclosed herein may be applied to any number of software processes or applications. For example, a computer system may interact with a human and respond to user queries and other commands using any technique known to those of skill in the art, including text, gestures, and the like. Various aspects of the disclosure will now be described with regard to certain examples and embodiments, which are intended to illustrate but not limit the disclosure.

Figure 1B:
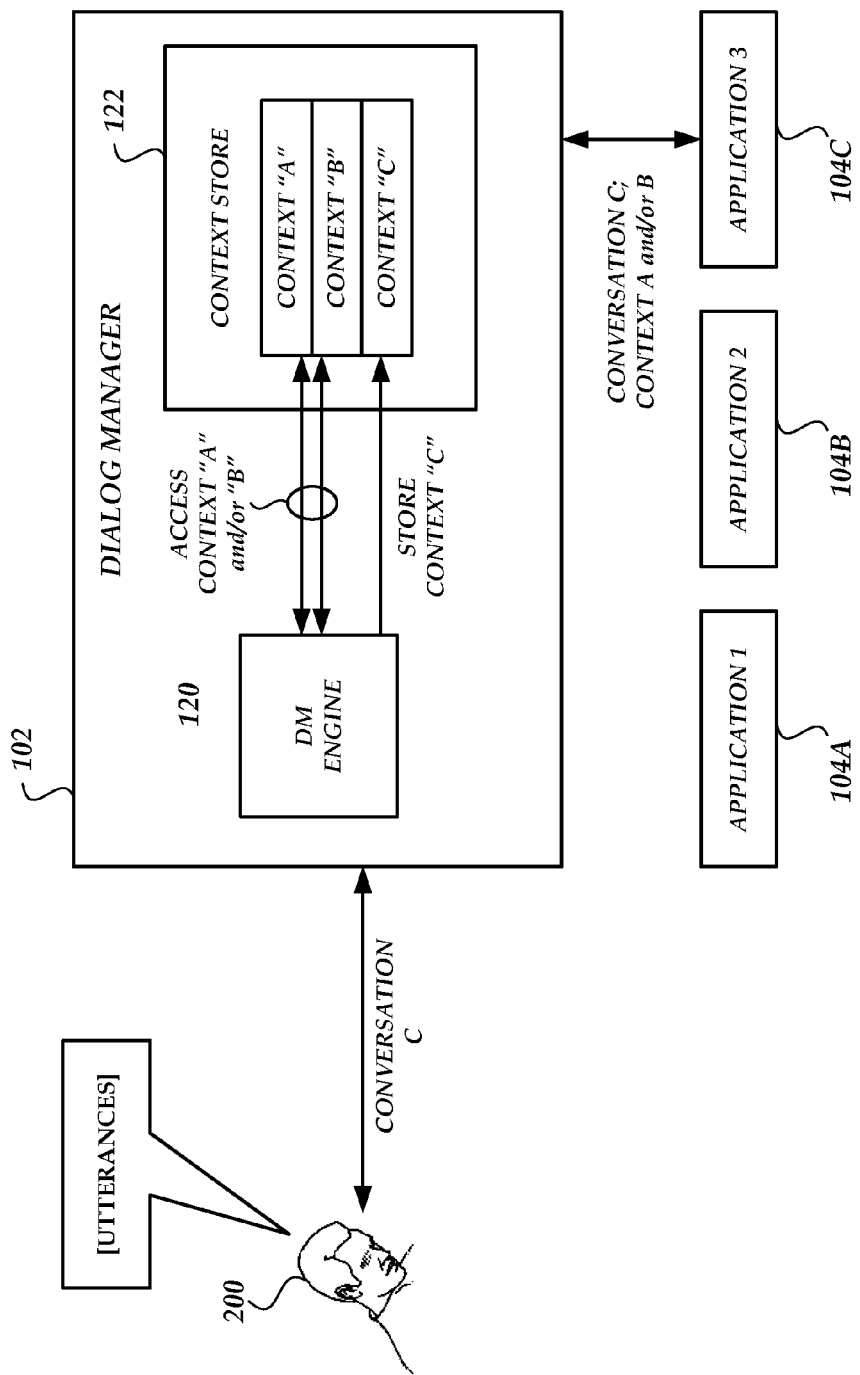

With reference to an illustrative example, a user may issue spoken commands or otherwise make spoken utterances to a computing device. The computing device may be configured to perform speech recognition on the utterances and perform various functions responsive to spoken user commands and other information in the utterances. For example, the computing device may execute applications, provide audible feedback, and the like. The interactions between the user and the computing device may be referred to as a dialog or conversation. The term "conversation" will be used below for simplicity. FIGS. 1A and 1B illustrate a user 200, a dialog manager 102, several applications 104*a*-104*c* and various interactions and data flows that may occur during a series of conversations. It will be appreciated by those of skill in the relevant art that many of the devices, components, and data flows that may be included or used in such conversations are not shown in order to simplify the figures and following discussion.

The dialog manager 102 may be implemented as hardware or as a combination of software and hardware. In some embodiments, the dialog manager 102 may be implemented in a general purpose computing device or as a specialized, dedicated dialog management computing device. The dialog manager 102 may include a dialog management engine 120 and a context store 122. The dialog management engine 120 may execute rules or follow scripts in order to conduct conversations with a user. The context store 122 may be used to store contextual information regarding prior conversations.

Illustratively, a user 200 may initiate a conversation with the dialog manager 102, such as conversation "A" shown in FIG. 1A. Conversation "A" may include a spoken user command from the user 200 and, optionally, one or more prompts from the dialog manager 102 for information relevant to user command. For example, the user 200 may say "Play songs by Artist A on internet radio." The dialog manager 102 may obtain speech recognition results from, e.g., an ASR module and/or NLU module (not shown) of the same computing device or a different computing device. The DM engine 120 may process the speech recognition results and execute application 1 104A responsive to the user command. Application 1 104A may begin playback of an internet radio station of songs by Artist A. In some embodiments, the DM engine 120 may prompt the user for additional information, such as the user's password, the preferred service provider of internet-based radio, etc., prior to or concurrently with execution of the internet radio application 104A.

The dialog manager 102 may also store contextual information regarding the conversation in the context store 122. Such contextual information can be used during subsequent conversations, as described in greater detail below, to improve efficiency and provide a better user experience. Generally described, contextual information includes information about the user utterances, dialog manager processing, or execution of some function by an application or service responsive to the conversation; data provided to or from the user, dialog manager, or the application or service; information about the context in which the conversation occurred; and the like. In some embodiments, contextual information may include some or all of the speech recognition results obtained by the dialog manager 102 during the course of the conversation. For example, the speech recognition results stored in the context store 122 may include named entities determined by an NLU module (e.g., an "artist" entity for Artist A), a set of slots that were filled by an NLU module or by the DM engine 120 during the course of the conversation, a transcript of a user utterance, or some other form of speech recognition results. In some embodiments, contextual information may include information that an application (e.g., the internet radio application 104A) indicates should be stored in the context store 122. In some embodiments, other information about how the dialog manager 102 or speech recognition modules interpreted a user's utterance, the processing performed or initiated by the dialog manager 102 responsive to the conversation, and/or any other information associated with the conversation may be stored in the context store 122.

Returning to the previous example, the user 200 may initiate a new conversation—conversation "B"—while the internet radio station of songs by Artist A is playing. Conversation "B" may not be directly related to Conversation "A" or may not be an extension of Conversation "A." Illustratively, the user may say: "Set a reminder to walk the dog at 6:00." Such a spoken command may be considered to be separate from Conversation "A" based on some criteria, such as an elapsed period of time (e.g., utterances that occur more than a threshold period of time after the last interaction may be considered to be the start of a separate conversation), the nature of the command (e.g., an utterance to "skip" to the next song may be considered part of conversation "A" because it is directed to the same application—the internet radio application 104A—while utterances to set reminders may be handled by a separate application and therefore may be considered to be a separate conversation), or some other criteria. The dialog manager 102 may continue conversation "B" as necessary, eventually executing application 2 104B to set the desired reminder. As shown, contextual information for conversation "B" may also be stored in the context store 122.

In some embodiments, context data for n conversations may be stored in the context store 122, where n is some predetermined, dynamically determined, or user-selectable number. In some embodiments, context data for all conversations within an amount of time t may be stored, where t is some predetermined, dynamically determined, or user-selectable number of minutes, seconds, or other measure of time. In some embodiments, the context store 122 may have a size s, where s is some predetermined, dynamically determined, or user-selectable amount of storage space. Context data for all prior conversations may be stored until the total required storage size reaches s, at which point context data for the oldest conversation(s), or the least-used context data, may be purged from the context store 122 to make room for contextual information for each subsequent conversation. Other storage management schemes may be used.

Returning to the prior example, the user 200 may initiate another conversation—conversation "C"—as shown in FIG. 1B. Conversation "C" may be separate from conversations "A" and "B" as described above. For example, the user 200 may say: "Shop for songs by this artist." The application which handles shopping for music, e.g., application 3 104C, may be separate from the application that handles playback of internet radio, e.g., application 1 104A. Accordingly, performance of the requested function may not be as simple as executing a function of the internet radio application 104A to shop for songs by the artist whose music is currently playing. Rather, the music shopping application 104C may require that an artist be specified in order to execute a search for music filtered by artist. Conventional dialog managers may initiate one or more prompts to obtain the artist's name from the user 200, even though the user 200 provided the artist's name in a prior conversation directed at a different application. However, because contextual information for conversation "A" has been stored in the context store 122, the dialog manager 102 shown in FIG. 1B may obtain the artist's name from the context store 122 without prompting the user 200. The dialog manager 102 can provide the music shopping application 3 104C with information relevant to conversation "C," including stored contextual information from conversation "A" such as the name of Artist A.

The example described above is illustrative only, and is not intended to be limiting. The context sharing techniques described herein may be used in any number of other examples in order to improve perceived performance and overall user experience. For example, in some embodiments the dialog manager 102 may interrupt a conversation in order to perform some required system process or to perform some previously requested task. Returning to the example above, the user 200 has requested to be reminded at 6:00 to walk the dog. If the user 200 is engaging in a conversation with the dialog manager 102 at 6:00, the dialog manager 102 may interrupt the conversation in order to provide the requested reminder. Before doing so, the dialog manager 102 may store the context for the current conversation in the context store 122. Once the reminder has been provided and the user 200 has optionally provided additional commands related to the reminder (e.g., "remind me again in 15 minutes," "close the reminder", etc.), the context of the interrupted conversation may be reloaded from the context store 122. In this way, the interrupted conversation may be resumed rather than terminated and restarted.

Figure 2:
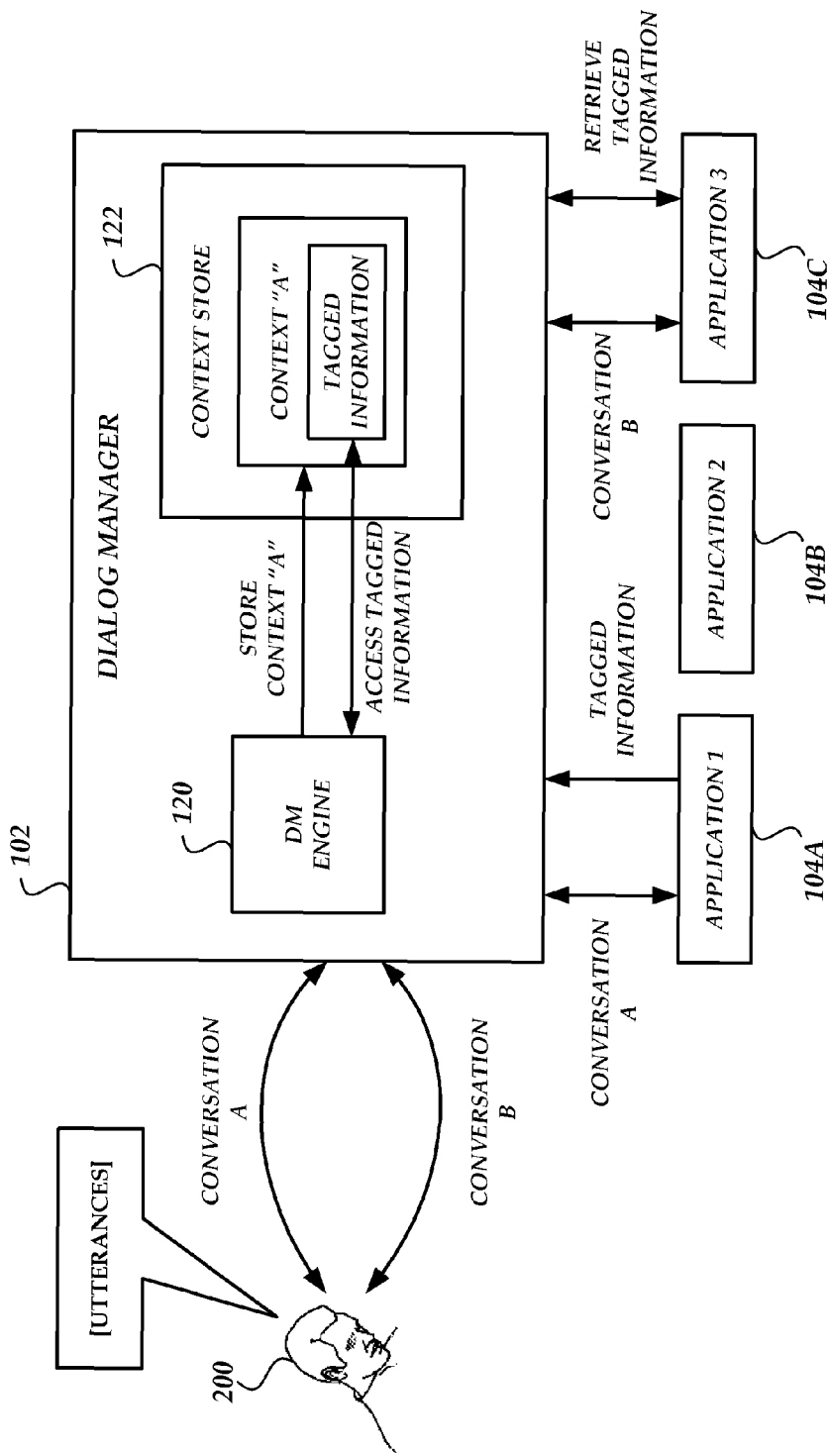
FIG. 2 is a block diagram of illustrative interactions between a user, a dialog manager and various applications showing sharing of tagged contextual information.

In some embodiments, an application or some other module or component may explicitly specify or provide information to be stored in the context store 122. For example, an application may execute some function responsive to a conversation, but the application may provide additional information that may be useful in subsequent conversations. Such additional information may not have been provided to the user or otherwise used in response to the conversation that caused its creation. FIG. 2 illustrates an example of an application storing such additional data in the context store, and a separate application using the additional information responsive to a subsequent conversation.

As shown in FIG. 2, a user 200 and dialog manager 102 may engage in conversation "A." For example, the user 200 may say "What is the current price of XYZ stock?" The dialog manager 102 may obtain and process speech recognition results, prompt the user for any other required information, cause execution of application 1 104A (which may be a stock price application in this example), and provide the requested information to the user 200. The requested information in this example is the current price of a single stock, which may be easily presented to the user audibly (e.g., "The current price of XYZ is $5.00.") However, the stock price application 104A may be configured to generate additional information, such as a graphic of stock prices over time, news relevant to investment in the particular stock, and the like. Although the user 200 did not specifically ask for such information, the information may be provided by the stock price application 104A for the user's convenience. For example, a user may often wish to obtain additional information about a stock after receiving the current price. By proactively making the additional information available, the application 104A may improve the efficiency and overall user experience with the system.

The additional information provided by a given application may be stored in the context store 122 or some other data store, and the dialog manager 102 can then make the additional information available to applications in subsequent conversations. Generally described, the additional information provided by an application may be in any format that is understood by a consumer of the information. The application providing the additional information may use standard formats (e.g., XML files, JPEG images, etc.) or proprietary formats. When using standard formats, the "providing" application (e.g., the application that provides the additional information to the dialog manager 102 for storage) may be responsible for indicating the format(s) in which it will provide additional information such that "consuming" applications (e.g., the applications that access the additional information from the dialog manager 102) know which format to expect. When using a proprietary format (e.g., a non-standard format), the "providing" application may be responsible for documenting the format such that a "consuming" application may understand how to present or otherwise process data obtained in the proprietary format. In some embodiments, the "consuming" application may be responsible for indicating the format(s) that it is configured to consume, or for documenting a proprietary format such that "providing" applications may provide information consumable by the "consuming" application. In some embodiments, the additional information provided to the dialog manager 102 may be "tagged" according to its intended use, intended consuming application, or some other characteristic. For example, information which may be sent to computing devices or emailed to contacts, such as text, images, and the like, may be tagged accordingly.

In some embodiments, additional information may be associated with an access configuration. The access configuration may specify which applications may access the additional information, under what circumstances the additional information may be accessed, how long the additional information may be stored, or the like. An access configuration may be associated with a particular item or group of additional information, all information from a given application, all information that a given application may access, etc. In some embodiments, the access configuration may be partially or completely user-configurable.

Returning to the example above, the stock price application 104A may provide additional information as an HTML page that optionally includes embedded references to images (e.g., stock price graphs). The stock price application 104A may further tag the additional information as "sendable" to other devices (e.g., due to the standardized format), as "displayable" by browser applications, or the like. In some embodiments, an application may provide instructions on how to access additional information (e.g., a URL of the HTML page).

After hearing the current price of the stock as requested, the user may initiate a subsequent conversation—conversation "B." For example, the user may say: "Send that to my tablet." The dialog manager 102 may process speech recognition results and determine that the user wishes to execute a function or application, such as application 104C, to send some information to another device. The dialog manager 102 may also determine that the term "that" refers to some recently accessed information. The dialog manager 102 may access the context store 102 for recently accessed or provided information that may be sent to another device (e.g., additional information that has been tagged as "sendable," additional information in a format that is suitable for easy transmission to another device, etc.). The dialog manager 102 may then provide the HTML page that it received from the stock price application 104A to the send application 104C.

In some embodiments, the dialog manager 102 may initiate or otherwise execute the application appropriate to the current conversation, and that application may request information in the context store 122. For example, the dialog manager 102 may execute the send application 104C, providing information about the user's tablet so that the send application 104C can send information to it. The send application 104C may then query the dialog manager 102 (or the context store 122 directly) for information that may be sent to another device. The dialog 102 may then provide the HTML page in response to the query from the send application 104C.

Spoken Language Processing System Environment

Figure 3:
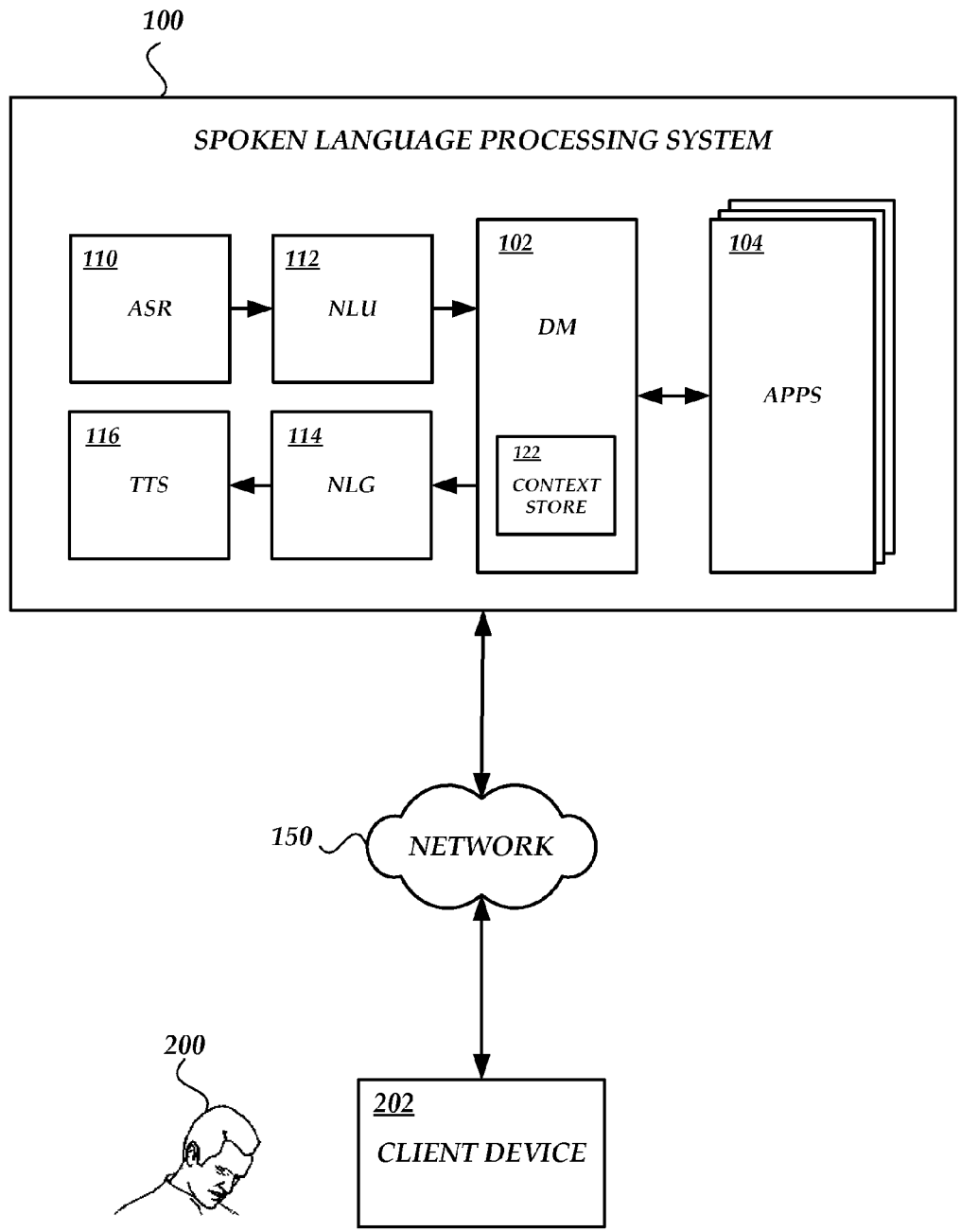
FIG. 3 is a block diagram of an illustrative network environment in which a spoken language processing system may be implemented.

FIG. 3 illustrates a spoken language processing system 100 and a client device 202. The spoken language processing system 100 can be a network-accessible system in communication with the client device 202 via a communication network 150, such as a cellular telephone network or the Internet. A user 200 may use the client device 202 to submit utterances, receive information, and initiate various processes, either on the client device 202 or at the spoken language processing system 100. For example, the user can issue spoken commands to the client device 202 in order to book flights, set reminder, listen to music, or perform other computing tasks as described above.

The client device 202 can correspond to a wide variety of electronic devices. In some embodiments, the client device 202 may be a computing device that includes one or more processors and a memory which may contain software applications executed by the processor(s). The client device 202 may include a speaker or other audio output component for presenting or facilitating presentation of audio content. In addition, the client device 202 may contain a microphone or other audio input component for accepting speech input on which to perform speech recognition. Illustratively, the client device 202 may be a personal computing device, laptop computing device, hand held computing device, terminal computing device, mobile device (e.g., mobile phone or tablet computing device), wearable device configured with network access and program execution capabilities (e.g., "smart eyewear" or "smart watch"), wireless device, electronic reader, media player, gaming console, set-top box, television configured with network access and program execution capabilities (e.g., "smart TV"), or various other electronic devices and appliances.

The spoken language processing system 100 can be any computing system that is configured to communicate via a communication network. For example, the spoken language processing system 100 may include any number of server computing devices, desktop computing devices, mainframe computers, and the like. In some embodiments, the spoken language processing system 100 can include several devices physically or logically grouped together, such as an application server computing device configured to perform speech recognition on an utterance and a database server computing device configured to store records and speech recognition models.

The spoken language processing system 100 can include an ASR module 110, an NLU module 112, a dialog manager 102, any number of applications 104, a natural language generation ("NLG") module 114, and a text-to-speech ("TTS") module 116. In some embodiments, the spoken language processing system 100 can include various modules and components combined on a single device, multiple instances of a single module or component, etc. For example, the spoken language processing system 100 may include a separate dialog manager 102 server; a server or group of servers configured with ASR and NLU modules 110, 112; a server or group of servers configure with application modules 104, and a server or group of servers configured with NLG and TTS modules 114, 116. In multi-device implementations, the various devices of the spoken language processing system 100 may communicate via an internal communication network, such as a corporate or university network configured as a local area network ("LAN") or a wide area network ("WAN"). In some cases, the devices of the spoken language processing system 100 may communicate over an external network, such as the Internet, or a combination of internal and external networks.

In some embodiments, the features and services provided by the spoken language processing system 100 may be implemented as web services consumable via a communication network 150. In further embodiments, the spoken language processing system 100 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The network 150 may be a publicly accessible network of linked networks, possibly operated by various distinct parties, such as the Internet. In other embodiments, the network 150 may include a private network, personal area network ("PAN"), LAN, WAN, cable network, satellite network, etc. or some combination thereof, each with access to and/or from the Internet. For example, the devices of the spoken language processing system 100 may be located within a single data center, and may communicate via a private network as described above. The client device 202 may communicate with spoken language processing system 100 via the Internet. The client device 202 may have access to the Internet via a wired or WiFi connection, or via a cellular telephone network (e.g., a Long Term Evolution or LTE network).

In some embodiments, a spoken language processing system 100 may include fewer or additional modules than those shown in FIG. 3. For example, a spoken language processing system 100 may not include application modules 104, but rather may interact with applications or services that are hosted by or otherwise associated with systems separate from the spoken language processing system 100. For example, a separate network-accessible system may provide one or more applications 104, the user device 202 may include one or more applications 104, etc. In some embodiments, the dialog manager 102 may not include an integrated context store 122. Rather, the context store 122 may be logically or physically separate (e.g., in a different memory space or on a different computing device) from the dialog manager 102.

In some embodiments, some or all of the features or components of the spoken language processing system 100 may be provided on the client device 100. For example, the client device 202 may include a dialog manager 102, one or more applications 104, and speech recognition and synthesis functionality. Such a client device 202 may therefore engage in conversations with the user 202 without exchanging information with a remote spoken language processing system 100.

Process for Managing Context Information for Multiple Conversations

Figure 4:
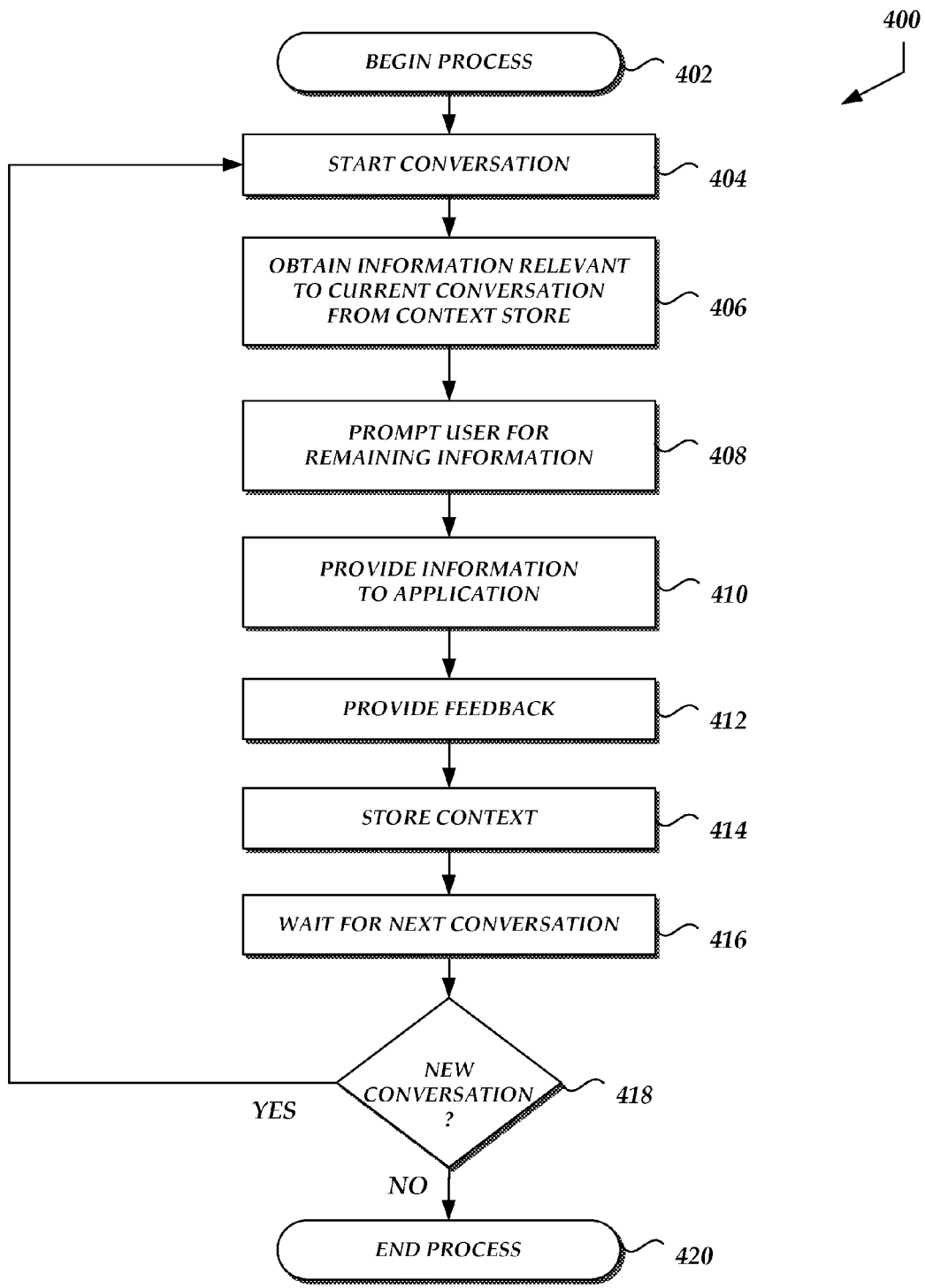
FIG. 4 is a flow diagram of an illustrative process for sharing context between conversations managed by a dialog manager.

With reference now to FIG. 4, a sample process 400 for managing contextual information associated with multiple conversations will be described. Advantageously, a dialog manager 104 or some other module or component of a spoken language processing system 100 may use the process 400 to use contextual information form previous conversations, or provide contextual information previous conversations to separate applications.

The process 400 begins at block 402. The process 400 may begin automatically upon initiation of a speech recognition session. The process 400 may be embodied in a set of executable program instructions stored on a computer-readable medium, such as one or more disk drives, of a computing system of the spoken language processing system 100, such as a dialog manager 102 server. When the process 400 is initiated, the executable program instructions can be loaded into memory, such as RAM, and executed by one or more processors of the computing system.

At block 404, a conversation may be started. For example, a user 200 may make an utterance that is captured by the client device 202. The utterance may include some request regarding a computing task, such as a command to execute a function, a query for information, etc. The client device 202 may transmit audio data of the user's utterance to the spoken language processing system 100 via the network 150. The audio data may be processed by the ASR and/or NLU modules 110, 112, and speech recognition results may be provided to the dialog manager 102.

At block 406, the dialog manager 102 or some other module or component of the spoken language processing system 100 can obtain information relevant to the current conversation from the context store 122, if available. For example, the context store 122 may include named entities from recent conversations. If an application or function that is to be executed responsive to the current conversation requires or would otherwise benefit from be provided with a particular named entity (e.g., a location named entity for a weather or flight booking application), the dialog manger 102 can query the context store 122 and obtain the most recent corresponding named entity.

At block 408, the dialog manager 102 or some other module or component of the spoken language processing system 100 can prompt the user 200 for any other information that an application or function that is to be executed responsive to the current conversation requires or would otherwise benefit from be provided with.

At block 410, the information obtained from the user 200 and/or from the context store 122 can be provided to the appropriate application(s) or function(s) responsive to the user's request, query, or other command.

At block 412, the dialog manager 102 or some other module or component of the spoken language processing system 100 may provide any feedback that the user requested or which the application 104 executing responsive to the current conversation indicates should be provided to the user.

At block 414, the dialog manager 102 or some other module or component of the spoken language processing system 100 can store contextual information for the current conversation in the context store 122, as described in greater detail above. In some embodiments, the contextual information may be stored at other portions of the process 400, such as before information is provided to the application 104, after information is received from the application 104, etc.

At block 416, the dialog manager 102 or some other module or component of the spoken language processing system 100 can wait for initiation of a subsequent conversation.

At decision block 418, the dialog manager 102 or some other module or component of the spoken language processing system 100 can determine whether a new conversation has begun. If so, the process 400 may return to block 404. Otherwise, the process 400 may terminate at block 420, such as after a threshold period of time has passed. In some embodiments, the process 400 may return to block 416 to wait for the next conversation or the occurrence of some other event.

Process for Managing Additional Information

Figure 5:
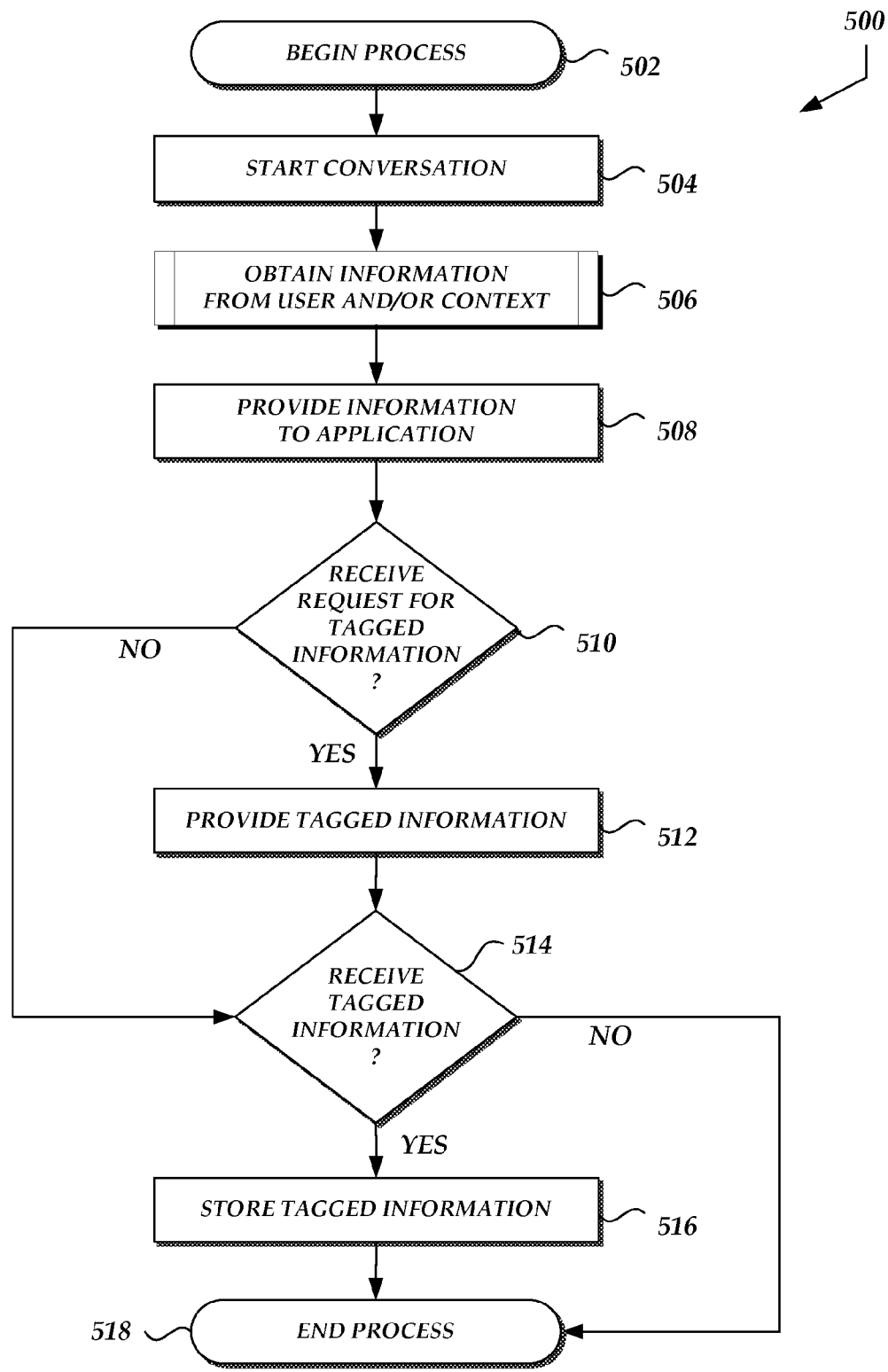
FIG. 5 is a flow diagram of an illustrative process for sharing tagged context information between conversations managed by a dialog manager.

With reference now to FIG. 5, a sample process 500 for managing additional information provided by an application responsive to a conversation will be described. Advantageously, a dialog manager 104 or some other module or component of a spoken language processing system 100 may use the process 500 to share the additional information with other applications, such as in response to subsequent conversations, without requiring the original application to provide the additional information at the later time.

The process 500 begins at block 502. The process 500 may begin automatically upon initiation of a speech recognition session. The process 500 may be embodied in a set of executable program instructions stored on a computer-readable medium, such as one or more disk drives, of a computing system of the spoken language processing system 100, such as a dialog manager 102 server. When the process 500 is initiated, the executable program instructions can be loaded into memory, such as RAM, and executed by one or more processors of the computing system.

At block 504, a conversation may be started. For example, a user may make an utterance that is received by the client device 202 and transmitted to the spoken language processing system 100 via the network 150. The utterance may be processed by the ASR and/or NLU modules 110, 112, and speech recognition results may be provided to the dialog manager 102. For example, the utterance may be a request for the weather in a particular city. The user may expect an audible response, such as synthesized speech of the weather forecast in the target city.

At block 506, the dialog manager 102 or some other module or component of the spoken language processing system 100 can obtain information that an application may need to perform a function requested by the user. For example, the dialog manager can prompt a user 200 for a city name and/or obtain contextual information regarding city names or locations spoken by the user (or to the user) during prior conversations.

At block 508, the dialog manager 102 or some other module or component of the spoken language processing system 100 can provide information to an appropriate application 104. In the present example, the spoken language processing system 100 can provide the city name to a weather application.

At decision block 510, the dialog manager 102 or some other module or component of the spoken language processing system 100 can determine whether a request for tagged information, or other information provided by another application, has been received from the presently executing application. If so, the process 500 can proceed to block 512. In the present example, the weather application may not make a request for additional information. Therefore, the process 500 can proceed to block 514. [0054] At decision block 514, the dialog manager 102 or some other module or component of the spoken language processing system 100 can determine whether tagged or other additional information has been received from the presently executing application for storage and possible access by other applications. If so, the process 500 proceeds to block 516, where the tagged information is stored (e.g., in the context store 122), as described in greater detail above. The additional information may be provided by an application for the primary, express, or sole purpose of being shared with, or provided to, a separate application which may process it or in turn provide it to the user. The additional information may not be information that is spoken by the user or provided to the user in connection with the function that causes its creation. In the present example, the additional information may be a detailed weather forecast (e.g., a 7-day or hourly forecast) or a forecast in a different modality than the user can currently receive or would like to receive (e.g., an HTML fragment). The additional information may therefore be stored in the context store 122.

As will be appreciated by those of skill in the relevant art, different branches of the process 500 may be taken during subsequent executions of the process 500, thereby providing different results. Returning to the example above, a user may receive an audible read out of the weather forecast in response to the first user request. The user may subsequently say "send that to my tablet" or "send that to John." When the process 500 is executed and proceeds to block 508, the request may be provided to an application configured to send information to different devices or user contacts.

At decision block 510, the dialog manager 102 may receive a request for tagged information or other additional information. In the present example, the request may be a request for information that has been "tagged" as "sendable," or for other information in the context store which may be used by the application.

At block 512, the dialog manager 102 can provide the previously stored information (e.g., the HTML fragment of the weather forecast) to the requesting application. Note that the HTML fragment was retrieved from the context store 122 (or some other data store) because it was generated in connection with a prior conversation or execution of the process 500. However, the HTML fragment was not provided to the user in connection with that prior conversation.

At block 514, the second application in the present example may not provide any additional information to be stored in the context store 122, and therefore the process 500 may terminate at block 518.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a computer-readable memory storing executable instructions; and
one or more processors in communication with the computer-readable memory, wherein the one or more processors are programmed by the executable instructions to at least:
obtain first audio data regarding a first utterance of a user, the first utterance associated with a first user request;
perform speech recognition on the first audio data to generate first speech recognition results;
cause a first application to perform a first function responsive to the first user request based on the first speech recognition results, wherein performance of the first function comprises presenting information in a first modality;
receive, from the first application, contextual information associated with the first user request in a format associated with a second application and information regarding use of the contextual information in the format, wherein the contextual information is not provided to the user in response to performing the first function;
store the contextual information and the information regarding use of the contextual information in the format;
subsequently, obtain second audio data regarding a second utterance of the user, the second utterance associated with a second user request;
perform speech recognition on the second audio data to generate second speech recognition results;
determine that the second application is associated with the second speech recognition results;
provide, to the second application, the contextual information associated with the first user request and the information regarding use of the contextual information in the format; and
cause the second application to perform a second function responsive to the second user request based on the contextual information, the information regarding use of the contextual information in the format, and the second speech recognition results, wherein performance of the second function comprises presenting information in a second modality different than the first modality.

2. The system of claim 1, further comprising an electronic data store configured to store a plurality of contextual information received from a plurality of applications.

3. The system of claim 1, wherein the first user request is associated with a first dialog, and wherein the second user request is associated with a second dialog separate from the first dialog.

4. The system of claim 1, wherein the contextual information is associated with an access configuration indicating that the second application may access the contextual information.

5. The system of claim 1, wherein the contextual information comprises one of: a visual representation of information associated with a response presented to the user audibly, or additional information associated with information presented to the user in response to the first utterance.

6. A computer-implemented method comprising:
under control of one or more computing devices configured with specific computer-executable instructions,
obtaining first speech recognition results associated with a first user request;
performing, using a first application, a first function responsive to the first user request based on the first speech recognition results, wherein performing the first function comprises presenting information in a first modality;
generating, using the first application, contextual information regarding the first user request in a format associated with a second application, wherein the contextual information is not provided to the user in response to the first request;
storing the contextual information and information regarding use of the contextual information in the format;
obtaining second speech recognition results associated with a second user request;
determining to perform a second function responsive to the second user request based on the second speech recognition results; and
performing, using the second application, the second function based at least in part on the contextual information regarding the first user request and the information regarding use of the contextual information in the format, wherein performing the second function comprises presenting the contextual information in a second modality different than the first modality.

7. The computer-implemented method of claim 6, wherein the contextual information comprises at least one of information regarding processing of the first user request, information regarding performance of the first function, information formatted for a different application; information formatted for a different modality; or metadata for consumption by a different application.

8. The computer-implemented method of claim 6, further comprising storing contextual information regarding a plurality of user requests.

9. The computer-implemented method of claim 8, wherein performing the second function is additionally based on contextual information regarding an additional user request separate from the first user request and the second user request.

10. The computer-implemented method of claim 8, further comprising limiting an amount of contextual information that is stored, the limiting based on at least one of: a time associated with an item of contextual information, a size of an item of contextual information, or a number of user requests for which contextual information is stored.

11. The computer-implemented method of claim 6, wherein the first user request is associated with a first dialog, and wherein the second user request is associated with a second dialog separate from the first dialog.

12. The computer-implemented method of claim 6, wherein the contextual information is associated with an access configuration indicating that the second application may access the contextual information.

13. The computer-implemented method of claim 6, further comprising:
generating the contextual information based on the first user request;
determining that the contextual information is not suitable for presentation in the first modality; and
associating the contextual information with the second modality.

14. The computer-implemented method of claim 6, wherein:
presenting the information in the first modality comprises presenting the information through audio; and
presenting the contextual information in the second modality comprises presenting the contextual information visually.

15. The computer-implemented method of claim 6, wherein generating the contextual information regarding the first user request in the format associated with the second application comprises:
determining, by the first application, that the contextual information regarding the first user request is related to the second function, wherein the second function is performed by the second application;
determining, by the first application, a format utilized by the second application to perform the second function; and
generating, by the first application, the contextual information in the format utilized by the second application to perform the second function.

16. The computer-implemented method of claim 6, wherein generating the contextual information regarding the first user request in the format associated with the second application comprises:
determining, by the second application, that the contextual information regarding the first user request is related to the second function, wherein the second function is performed by the second application;
sending, from the second application to the first application, information regarding a format utilized by the second application to perform the second function; and
generating, by the first application, the contextual information in the format utilized by the second application to perform the second function.

17. The computer-implemented method of claim 6, further comprising tagging the contextual information with metadata indicating that the contextual information is related to the second function.

18. One or more non-transitory computer readable media comprising executable code that, when executed, causes one or more computing devices to perform a process comprising:
obtaining first speech recognition results associated with a first user request;
performing, using a first application, a first function responsive to the first user request based on the first speech recognition results, wherein performing the first function comprises presenting information in a first modality;
generating, using the first application, contextual information regarding the first user request in a format associated with a second function of a second application, wherein the contextual information is not provided to the user in response to the first request;
storing the contextual information and information regarding use of the contextual information in the format;
obtaining second speech recognition results associated with a second user request;
determining to perform the second function responsive to the second user request based on the second speech recognition results; and
performing, using the second application, the second function based at least in part on the contextual information regarding the first user request and the information regarding use of the contextual information in the format, wherein performing the second function comprises presenting the contextual information in a second modality different than the first modality.

19. The one or more non-transitory computer readable media of claim 18, wherein the contextual information comprises at least one of information regarding processing of the user request, information regarding performance of the first function, information formatted for a different application; information formatted for a different modality; or metadata for consumption by a different application.

20. The one or more non-transitory computer readable media of claim 18, the process further comprising storing contextual information regarding a plurality of user requests.

21. The one or more non-transitory computer readable media of claim 20, wherein performing the second function is additionally based on contextual information regarding an additional user request separate from the first user request and the second user request.

22. The one or more non-transitory computer readable media of claim 20, the process further comprising limiting an amount of contextual information that is stored, the limiting based on at least one of: a time associated with an item of contextual information, a size of an item of contextual information, or a number of user requests for which contextual information is stored.

23. The one or more non-transitory computer readable media of claim 18, wherein the first user request is associated with a first dialog, and wherein the second user request is associated with a second dialog separate from the first dialog.

24. The one or more non-transitory computer readable media of claim 18, wherein the contextual information is associated with an access configuration indicating that the second application may access the contextual information.

* * * * *